United States Patent
Hemphill et al.

(10) Patent No.: US 10,543,789 B1
(45) Date of Patent: Jan. 28, 2020

(54) COMBINATION CARGO STOP AND STEP

(71) Applicant: FORD GLOBAL TECHNOLOGIES, LLC, Dearborn, MI (US)

(72) Inventors: Joshua R. Hemphill, White Lake, MI (US); Brian K. Sullivan, Plymouth, MI (US); Craig A. Moccio, Milan, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/284,220

(22) Filed: Feb. 25, 2019

(51) Int. Cl.
| | | |
|---|---|---|
| *B60R 3/02* | (2006.01) | |
| *B62D 33/03* | (2006.01) | |
| *B62D 33/033* | (2006.01) | |
| *B62D 33/037* | (2006.01) | |

(52) U.S. Cl.
CPC ............... *B60R 3/02* (2013.01); *B62D 33/03* (2013.01); *B62D 33/033* (2013.01); *B62D 33/037* (2013.01)

(58) Field of Classification Search
CPC ........ B60R 3/02; B62D 33/03; B62D 33/033; B62D 33/037
See application file for complete search history.

(56) References Cited

U.S. PATENT DOCUMENTS

| | | | | |
|---|---|---|---|---|
| 5,788,311 | A * | 8/1998 | Tibbals | B62D 33/0273 |
| | | | | 296/26.11 |
| 6,454,338 | B1 * | 9/2002 | Glickman | B60P 1/435 |
| | | | | 296/26.1 |
| 6,905,158 | B1 * | 6/2005 | Bastian | B60R 3/02 |
| | | | | 280/164.1 |
| 6,913,305 | B1 * | 7/2005 | Kern | B62D 33/03 |
| | | | | 296/51 |
| 6,918,624 | B2 * | 7/2005 | Miller | B60P 3/40 |
| | | | | 182/127 |
| 7,472,938 | B2 * | 1/2009 | Firzlaff | B62D 33/0273 |
| | | | | 296/57.1 |
| 7,712,811 | B2 * | 5/2010 | Heaman | B62D 33/0273 |
| | | | | 296/26.08 |
| 7,914,060 | B2 | 3/2011 | Scribner et al. | |
| 7,967,356 | B2 | 6/2011 | Stackpole | |
| 8,348,325 | B2 * | 1/2013 | Hausler | B62D 33/0273 |
| | | | | 296/51 |
| 9,302,719 | B1 * | 4/2016 | Krishnan | B60R 3/02 |
| 9,463,746 | B2 * | 10/2016 | Butlin, Jr. | B60R 3/02 |
| 10,005,396 | B2 * | 6/2018 | Spahn | B62D 33/03 |
| 10,077,083 | B1 * | 9/2018 | Survis | B62D 33/0273 |
| 10,081,303 | B1 * | 9/2018 | Ngo | B60R 3/00 |
| 10,464,618 | B2 * | 11/2019 | Loew | B62D 33/08 |

(Continued)

*Primary Examiner* — Erez Gurari
(74) *Attorney, Agent, or Firm* — Vichit Chea; MacMillan, Sobanski & Todd, LLC

(57) ABSTRACT

A tailgate includes an opening through a rear end of the tailgate when in a tailgate open position. The tailgate also includes a tailgate extender having support tubes extending through the opening and telescopically slidable outward from the tailgate, a laterally extending support beam supported by the support tubes, and a cargo-assist step pivotally mounted to the support beam, the cargo-assist step configured to pivot downwardly when the support tubes are pivoted downwardly to define a step and to pivot upwardly into a vertical position when the support tubes extend horizontally to define a cargo stop.

12 Claims, 3 Drawing Sheets

(56) References Cited

U.S. PATENT DOCUMENTS

| | | | |
|---|---|---|---|
| 2002/0070577 A1* | 6/2002 | Pool, III | B60R 3/02 |
| | | | 296/62 |
| 2004/0113450 A1* | 6/2004 | Fielding | B60N 2/3015 |
| | | | 296/62 |
| 2013/0049395 A1 | 2/2013 | Poirier | |
| 2014/0203587 A1* | 7/2014 | Krishnan | B60R 3/02 |
| | | | 296/62 |
| 2015/0165963 A1* | 6/2015 | Salter | B60Q 1/2661 |
| | | | 315/77 |
| 2015/0291086 A1* | 10/2015 | Salter | B60Q 1/2661 |
| | | | 362/485 |
| 2015/0336622 A1* | 11/2015 | Worden | B60R 3/007 |
| | | | 280/163 |
| 2017/0101138 A1* | 4/2017 | Povinelli | B60J 7/141 |
| 2017/0203799 A1* | 7/2017 | Quick | B62D 33/0273 |
| 2017/0282979 A1* | 10/2017 | Singer | B62D 33/0273 |
| 2017/0291551 A1* | 10/2017 | Krajenke | B62D 33/0273 |
| 2018/0043831 A1* | 2/2018 | Stojkovic | B62D 33/0273 |
| 2018/0065560 A1* | 3/2018 | Krishnan | B60R 3/02 |
| 2018/0065689 A1* | 3/2018 | Reiners | B62D 33/0273 |
| 2018/0072242 A1* | 3/2018 | Spahn | B60R 11/06 |
| 2018/0086391 A1* | 3/2018 | Raines | B60P 7/0876 |
| 2018/0201329 A1* | 7/2018 | Barrios Albert | B62D 33/03 |
| 2018/0229661 A1* | 8/2018 | Exline | B60R 3/02 |
| 2018/0257537 A1* | 9/2018 | Desimone | B60P 1/435 |
| 2019/0054961 A1* | 2/2019 | Ngo | B60R 3/02 |
| 2019/0249479 A1* | 8/2019 | Lewis | B62D 33/03 |
| 2019/0308550 A1* | 10/2019 | Buckley | B60P 7/0807 |

\* cited by examiner

COMBINATION CARGO STOP AND STEP

BACKGROUND OF THE INVENTION

The present invention relates to a tailgate for a pickup truck and more particularly to an extendable assembly that acts as both a step and a cargo stop.

Pickup truck operators may carry long items in the truck beds that extend beyond the length of the bed. In these situations, some may leave the tailgate open to accommodate the cargo. It is desirable, then, to provide some type of stop that prevents items from sliding backwards out of the bed while the vehicle is operating. Preferably, such a system adds minimal weight and complexity to the truck.

SUMMARY OF THE INVENTION

An embodiment contemplates a tailgate including an opening through a rear end of the tailgate when in a tailgate open position; and a tailgate extender having support tubes extending through the opening and telescopically slidable outward from the tailgate, a laterally extending support beam supported by the support tubes, and a cargo-assist step pivotally mounted to the support beam, the cargo-assist step configured to pivot downwardly when the support tubes are pivoted downwardly to define a step and to pivot upwardly into a vertical position when the support tubes extend horizontally to define a cargo stop.

An embodiment contemplates a tailgate including a rear end of the tailgate, when in a tailgate open position, having an opening therethrough; and a tailgate extender having a pair of support tubes extending through the opening and slidable outward therethrough, a support beam supported between the support tubes, and a cargo-assist step pivotally mounted to the support beam, the cargo-assist step configured to pivot downwardly to define a step and to pivot upwardly into a vertical position when the support tubes extend horizontally to define a cargo stop.

An advantage of an embodiment is that a single assembly may be employed to both provide a retractable step for ease in accessing items in a pickup truck bed as well as provide a stop to hold long items in the bed when the tailgate is left down.

DETAILED DESCRIPTION

Figure 1:
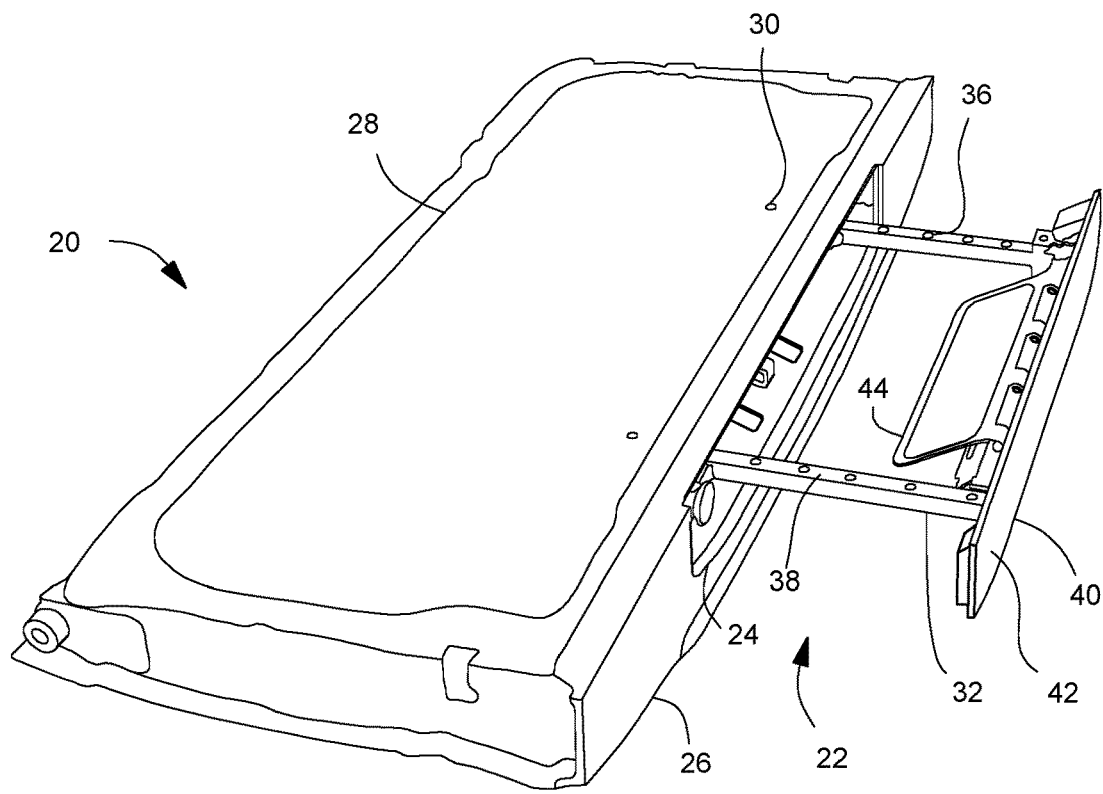
FIG. 1 is a schematic perspective view of a tailgate in a horizontal orientation (open position), with a tailgate extender extended outward in a horizontal orientation.
Figure 2:
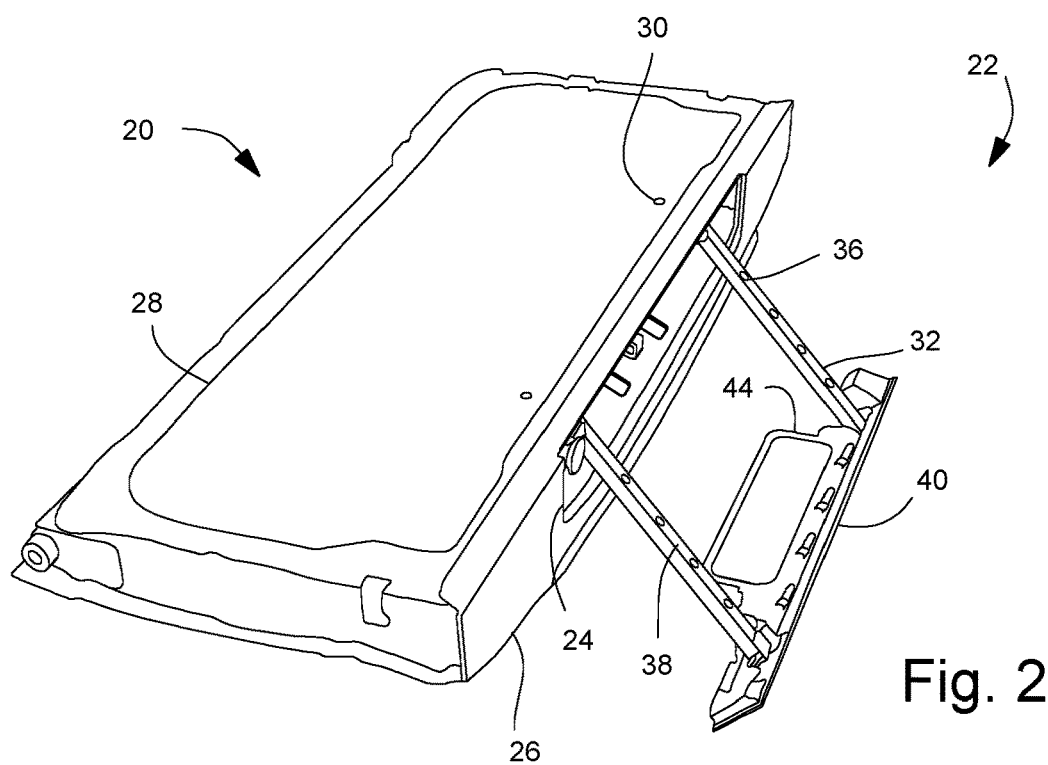
FIG. 2 is a schematic perspective view similar to FIG. 1, but with the tailgate extender tilted downward into a step assist position.

FIGS. 1-6 illustrate a pickup truck tailgate 20 shown in the open (horizontal orientation) position having a telescopically retractable tailgate extender 22. The mounting of the tailgate 20 to a pickup truck and the tailgate internal support structure for the tailgate extender 22 may be similar to structure described in U.S. Pat. No. 6,918,624 Miller et al., U.S. Pat. No. 7,712,811 Heaman et al. and U.S. Pat. No. 7,472,938 Firzlaff et al., all incorporated in their entirety herein by reference, and so will not be discussed in further detail herein.

The tailgate 20 includes an opening 24 for receiving the tailgate extender 22. This opening 24 is on the rear end 26 of the tailgate 20 when in the open position (the opening 24 is on top of the tailgate 20 when the tailgate is in the closed position). Near the opening 24, on the tailgate inner panel 28, are a pair of holes 30 that align laterally with step support tubes 32, discussed further below. These holes 30 are sized to removably receive and retain extension pins 34.

The tailgate extender 22 includes the step support tubes 32, which slide telescopically into and out of the tailgate 20 along guide supports within the tailgate 20. Each support tube 32 includes a set of extension lock openings 36 spaced along the top surface 38 of the respective tube 32. The extension lock openings 36 may be spaced the same on each support tube 32 and located to selectively align with the holes 30 for different amounts of support tube extension from the tailgate 20. The extension pins 34 are long enough to extend through the inner panel 28 and into the lock openings 36 to hold the support tubes 32 at various lengths of extension from the tailgate 20.

Extending laterally and mounted to the rear ends of the support tubes is a support beam 40. When the tailgate extender 22 is in a closed (telescopically retracted) position within the tailgate 20, the support beam 40 covers the opening 24, forming part of the tailgate end surface 42.

A cargo-assist step 44 is pivotally mounted to the support beam 40. The cargo-assist step 44 may be spring loaded to cause the step 44 to pivot to a neutral position essentially parallel to the step support tubes 32 (see FIG. 1). This may allow for easier insertion of the tailgate extender 22 into the tailgate 20 without the cargo-assist step 44 contacting the sides of the opening 24 in the tailgate 20. Additionally, the cargo-assist step 44 may include an upright latch 46 (shown in FIG. 3), which connects between the support beam 40 and cargo-assist step 44 to selectively latch the step 44 into a vertical orientation (i.e., upward extending in a direction essentially perpendicular to the step support tubes 32 (see FIGS. 3-6).

The operation of the tailgate extender 22 and cargo-assist step 44 will now be discussed. When one wishes to have the assistance of a step to access cargo in a pickup truck bed, then one pulls the tailgate extender 22 telescopically fully out of the tailgate 20 (see FIG. 1) and then tilts the step support tubes 32 downward (see FIG. 2). One can then step on the cargo-assist step 44, causing the step 44 to pivot against spring bias into a relatively horizontal position. This allows for easier access to cargo in a pickup truck bed.

Figure 3:
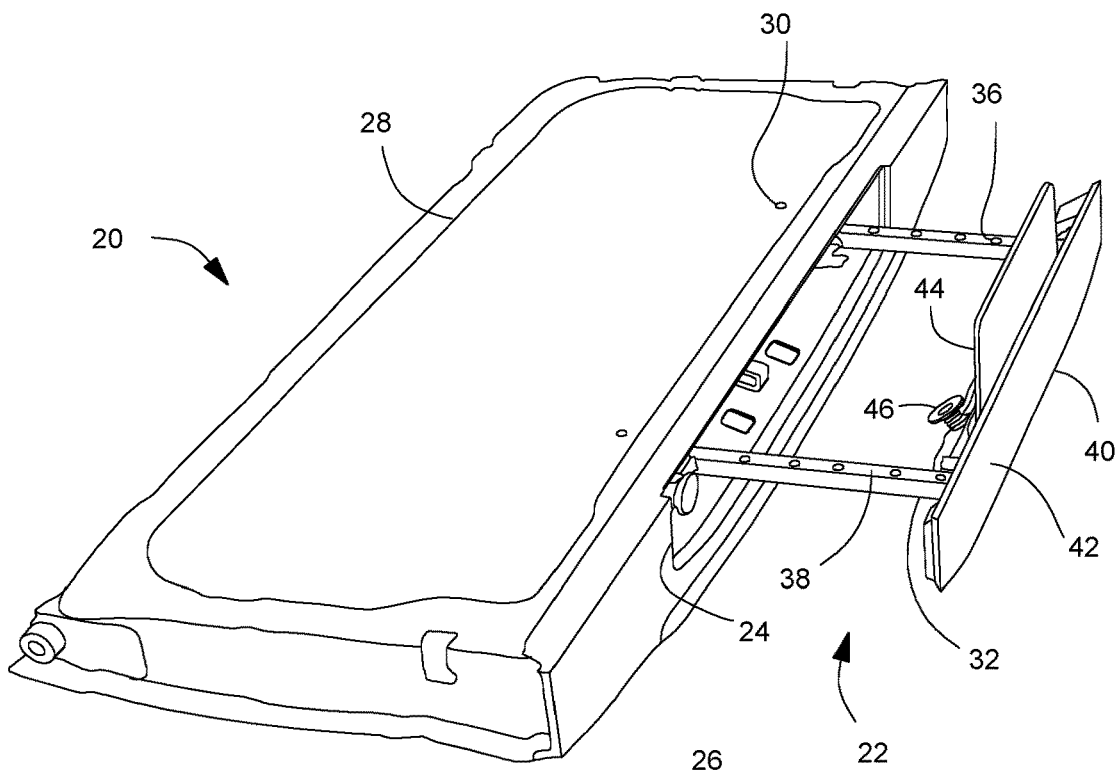
FIG. 3 is a schematic perspective view similar to FIG. 1, but with a cargo-assist step tipped upward into a vertical cargo stop position.
Figure 4:
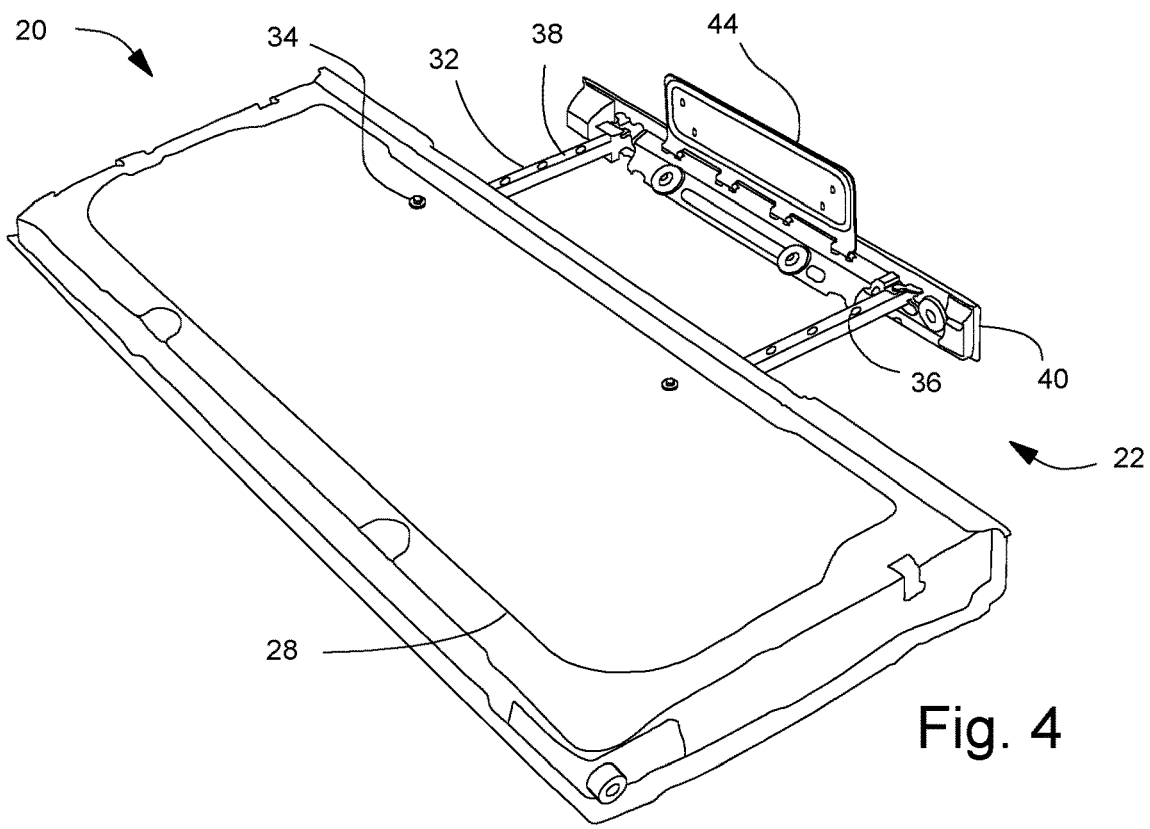
FIG. 4 is a schematic perspective view similar to FIG. 3, but shown from a different angle and with the tailgate extender in a more retracted position.
Figure 5:
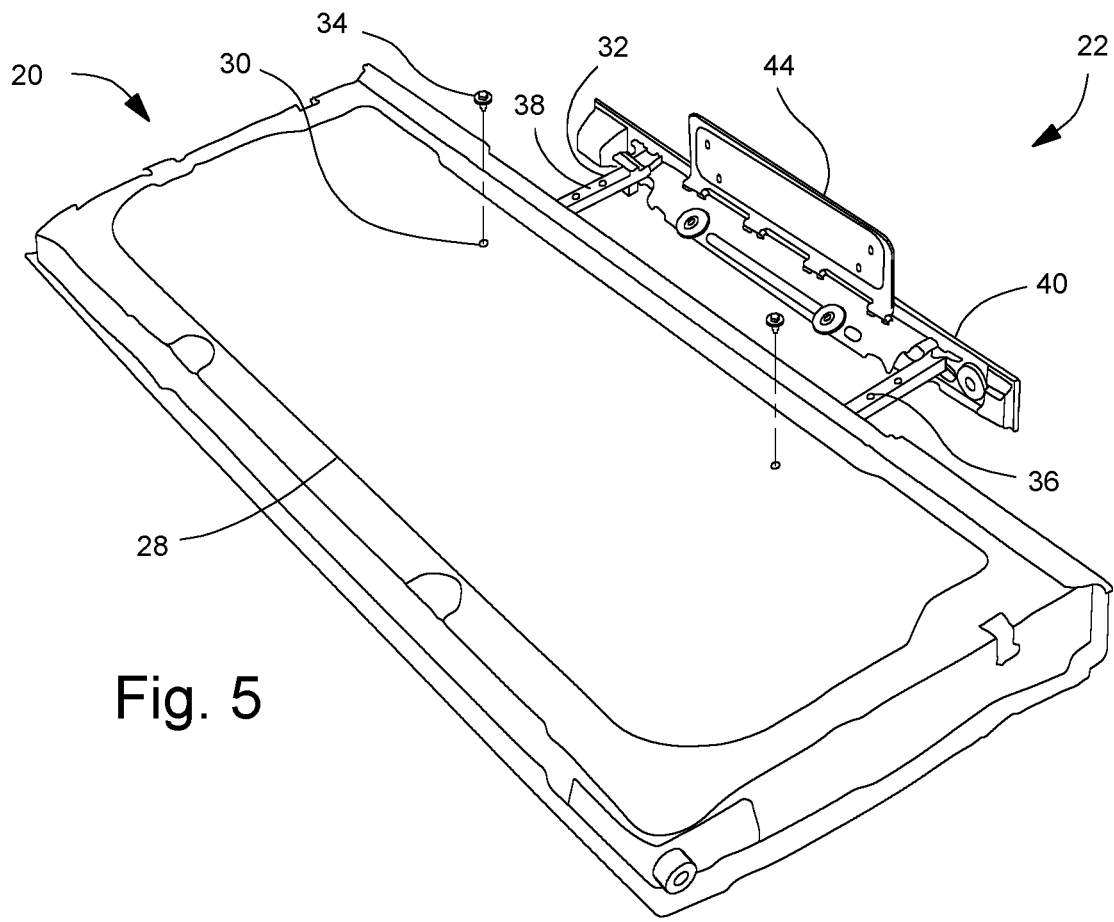
FIG. 5 is a schematic, perspective, partially exploded view similar to FIG. 4, but with the tailgate extender even more retracted and the extension pins shown removed from the tailgate.
Figure 6:
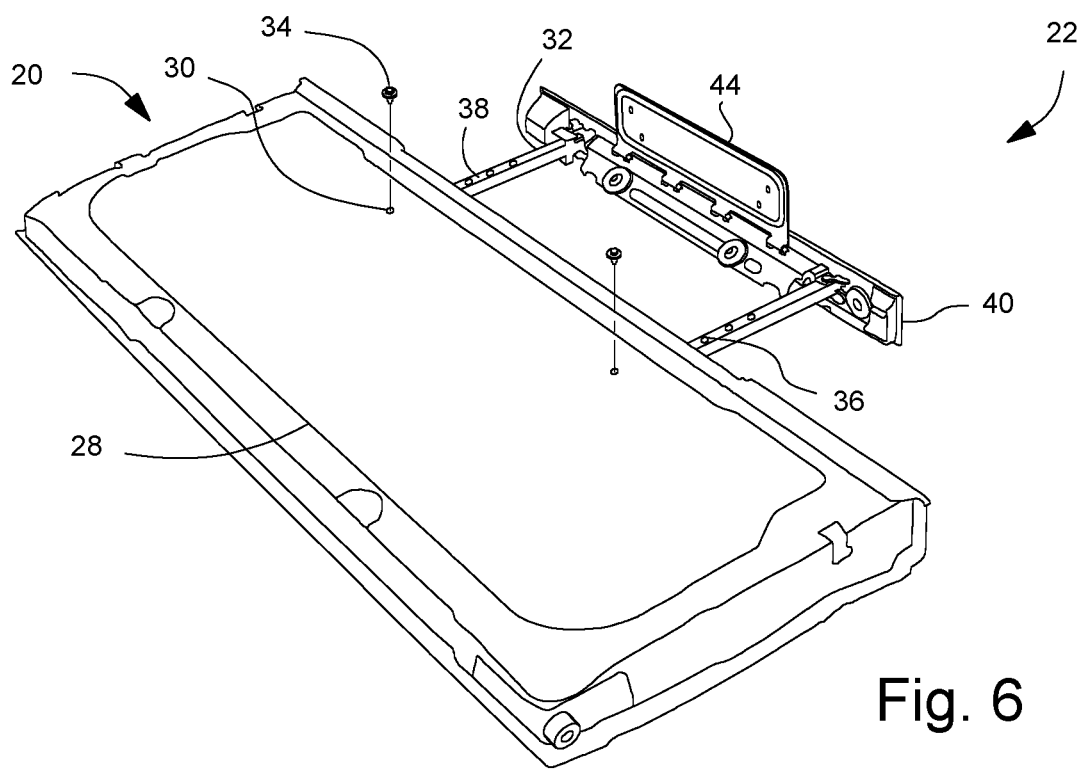
FIG. 6 is a schematic, perspective, partially exploded view similar to FIG. 5, but with the tailgate extender in a more extended position.

When one wishes to provide rearward support for long cargo that extends rearward beyond a truck bed, then one pulls the tailgate extender 22 telescopically from the tailgate 20 to a desired length for supporting the rear end of the cargo extending from the bed (see FIG. 3 for a greater extension, FIG. 4 for a somewhat shorter extension and FIG. 5 for an even shorter extension). At this point, one aligns a pair of extension lock openings 36 with the holes 30 in the tailgate inner panel 28 (see FIGS. 5 and 6) and then inserts the extension pins 34 through the holes 30 and into the extension lock openings 36 (see FIG. 4). One may grip the cargo-assist step 44 and pivot it upward to an upright position, at which point the upright latch 46 engages and holds the cargo-assist step 44 in this upright (vertical) position (see FIGS. 3-6). With the step 44 in this upright position, the step 44 provides a cargo stop to prevent cargo from slipping rearward past the tailgate extender 22.

When no longer needed as a cargo stop, the upright latch 46 may be actuated to release the cargo-assist step 44, at which point the spring bias of the step 44 will return the step 44 to the neutral position (see FIG. 1). The extension pins 34 may be removed from the tailgate 20, allowing the tailgate extender 22 to be telescopically retracted into the tailgate 20. The step support tubes 32 may include extension lock openings 36 that align with the holes 30 in the tailgate inner panel 28 when the tailgate extender 22 is fully retracted, thus allowing the pins 34 to be reinserted, if so desired. This may help to avoid losing the pins 34 when not in use.

The tailgate extender 22, then, includes the cargo-assist step 44 that provides dual functionality of both providing an assist step for one accessing a truck bed (see FIG. 2) and for providing a cargo stop (see FIGS. 3-6) to better secure long cargo extending from the truck bed.

While certain embodiments of the present invention have been described in detail, those familiar with the art to which this invention relates will recognize various alternative designs and embodiments for practicing the invention as defined by the following claims.

The invention claimed is:

1. A tailgate comprising:
   an opening through a rear end of the tailgate when in a tailgate open position; and
   a tailgate extender having support tubes extending through the opening and telescopically slidable outward from the tailgate, a laterally extending support beam supported by the support tubes, and a cargo-assist step pivotally mounted to the support beam, the cargo-assist step configured to pivot downwardly when the support tubes are pivoted downwardly to define a step and to pivot upwardly into a vertical position when the support tubes extend horizontally to define a cargo stop.

2. The tailgate of claim 1 further comprising:
   an inner panel defining an upper surface of the tailgate when in a horizontal position, the inner panel having a hole therethrough;
   one of the support tubes having extension lock openings selectively alignable with the hole as the support tubes are telescopically moved relative to the opening; and
   an extension pin extending through the hole and into one of the extension lock openings.

3. The tailgate of claim 2 wherein there inner panel includes a second hole therethrough, the other of the support tubes has second extension lock openings selectively alignable with the second hole, and a second extension pin extending through the second hole and into one of the second extension lock openings.

4. The tailgate of claim 2 wherein the cargo-assist step is biased toward an orientation essentially parallel to the support tubes.

5. The tailgate of claim 1 wherein the cargo-assist step is biased toward an orientation essentially parallel to the support tubes.

6. The tailgate of claim 5 including a latch mounted between the support beam and the cargo-assist step that is configured to selectively retain the cargo-assist step in the vertical position.

7. The tailgate of claim 2 including a latch mounted between the support beam and the cargo-assist step that is configured to selectively retain the cargo-assist step in the vertical position.

8. The tailgate of claim 1 including a latch mounted between the support beam and the cargo-assist step that is configured to selectively retain the cargo-assist step in the vertical position.

9. A tailgate comprising:
   a rear end of the tailgate, when in a tailgate open position, having an opening therethrough; and
   a tailgate extender having a pair of support tubes extending through the opening and slidable outward therethrough, a support beam supported between the support tubes, and a cargo-assist step pivotally mounted to the support beam, the cargo-assist step configured to pivot downwardly to define a step and to pivot upwardly into a vertical position when the support tubes extend horizontally to define a cargo stop.

10. The tailgate of claim 9 further comprising:
    an inner panel defining an upper surface of the tailgate when in a horizontal position, the inner panel having a hole therethrough;
    one of the support tubes having extension lock openings selectively alignable with the hole as the support tubes are telescopically moved relative to the opening; and
    an extension pin extending through the hole and into one of the extension lock openings.

11. The tailgate of claim 9 wherein the cargo-assist step is biased toward an orientation essentially parallel to the support tubes.

12. The tailgate of claim 9 including a latch mounted between the support beam and the cargo-assist step that is configured to selectively retain the cargo-assist step in the vertical position.

* * * * *